June 12, 1934.  F. B. FOWZER  1,962,641
CUTTING AND MILLING TOOL
Filed May 25, 1933
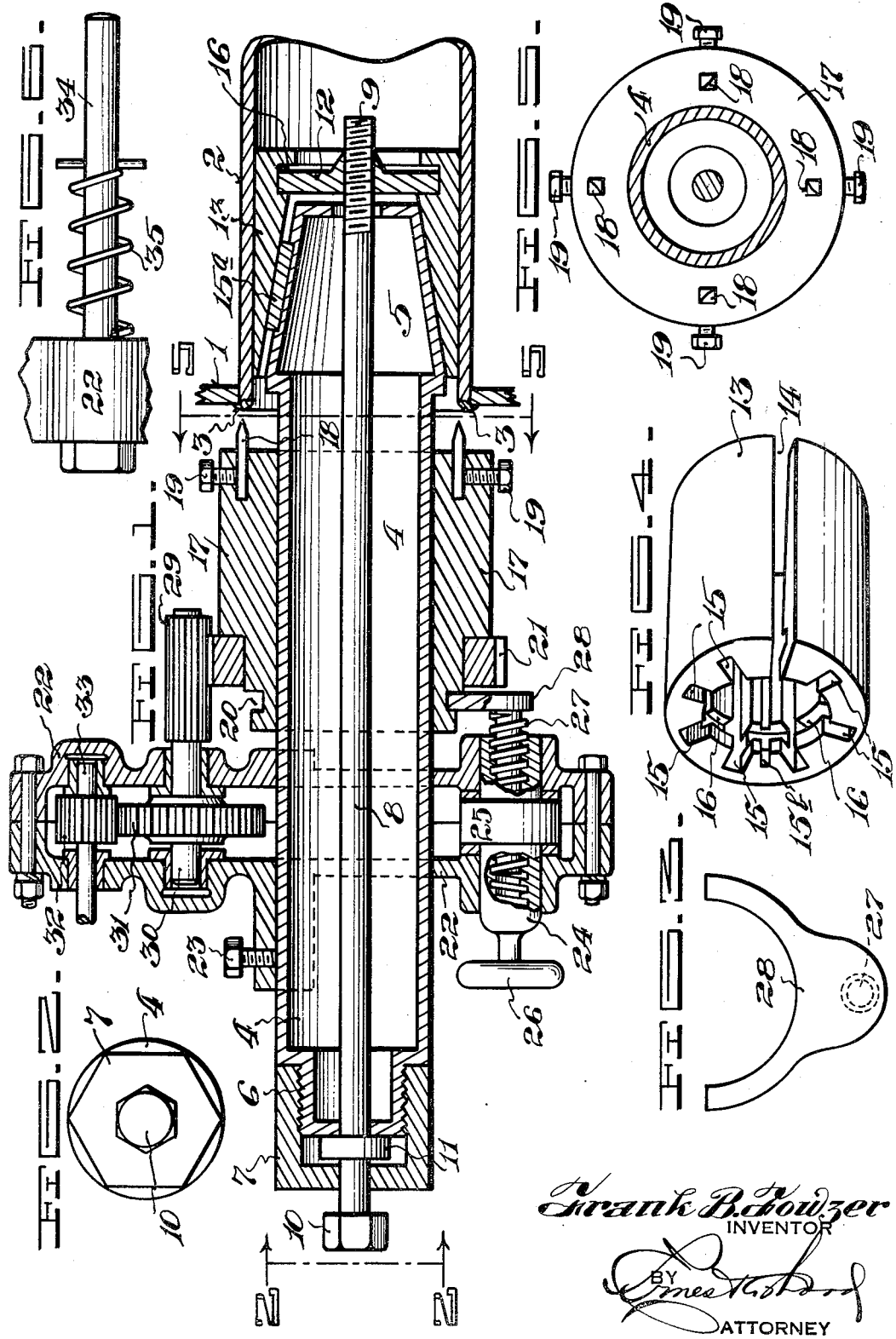

Patented June 12, 1934

1,962,641

UNITED STATES PATENT OFFICE 1,962,641

CUTTING AND MILLING TOOL

Frank B. Fowzer, Kilgore, Tex.

Application May 25, 1933, Serial No. 672,785

1 Claim. (Cl. 82—4)

This invention relates to cutting and milling tools and it has particular reference to a tool designed for repairing boilers.

The principal object of the invention is to provide a tool of the character specified for removing a bead of superfluous metal resulting from a weld around the tube holes in the fire box tube sheet of a boiler. In replacing boiler tubes, it is necessary that all superfluous metal of a previous weld be removed preparatory to welding in new tubes.

Another object of the invention is to provide a cutting tool having improved holding means, the design of which enables the tool to be mounted in such position that its cutting blades will rest directly on the work and regardless of the toughness of the material being cut, there is little likelihood that the tool will be displaced while in operation.

The invention further aims to provide means for adjusting the position of the tool on the work as well as means for conveniently advancing the cutting elements and retracting the same while the tool is in operation.

Broadly, the invention seeks to improve upon the method of replacing impaired boiler tubes and has been found especially useful in oil field work where it is desirable to do this work rapidly and thoroughly.

While it is of course obvious that the invention may be manually operated, in the interest of speed in performance and accuracy, the invention is shown as being designed for power operation.

With the foregoing objects as paramount, the invention has particular reference to its salient features of construction and arrangement of parts which will become manifest as the description proceeds, taken in connection with the accompanying drawing, wherein:—

Figure 1 is a view in longitudinal section showing the invention mounted on the work.

Figure 2 is an end view on lines 2—2 on Figure 1.

Figure 3 is a detail view of the cutter advancing and retracting fork.

Figure 4 is a detail perspective view of an expansible collar for holding the tool in operative position on the work.

Figure 5 is a view on lines 5—5 on Figure 1, and

Figure 6 is a detail view of a gauge rod or "feeler" for positioning the cutter relative to the work.

Continuing with a more detailed description of the drawing, 1 designates fragmentarily a conventional fire box boiler sheet which is usually perforated to receive the ends of a multiplicity of tubes 2. Conventionally, the tubes 2 are welded at 3 and there is a consequent superfluity of material at this point. Accordingly, when new tubes are mounted in the boiler, it is necessary that this old weld be removed. The invention is comprised primarily of a tubular member 4 having an end 5 in the form of a truncated cone, the opposite end being reduced at 6 and exteriorly threaded to receive a cap 7. The cap 7 is in the form of a hexagon as shown in Figure 2.

Through the tubular member 4 and of greater length is a shaft 8, one end of which is threaded at 9 and provided on its opposite end with a nut 10. Adjacent the nut 10 on the shaft 8 is a disc or enlargement 11 either integral with or secured against rotation on the shaft 8. This disc 11, as apparent in Figure 1 is interposed between a reduced end 6 of the member 4 and the cap 7 thereon. The purpose of this disc 11 is to constrain the shaft 8 against other than rotative movement. On the threaded end 9 of the shaft 8 is another disc 12 which is interiorly threaded and held against rotation, consequently, when the shaft 8 is rotated, the disc 12 will be advanced and retracted, due to the threaded relationship with the shaft 8.

Referring to Figure 4, an expansible collar 13 is provided and while its cylindrical continuity is broken by the slot 14, its expansibility is increased by reason of a series of internal grooves 15, which extend the entire length of the collar 13. The inner periphery of the collar 13 is of conical shape to be correspondingly received by the end 5 of the tubular member 4 and is of greater length than the coniform portion of the said end 5. A key 15a holds the collar 13 against rotation on the portion 5 of the tubular member and reposes within a slot 15b, as shown in Figure 4. This is borne out in Figure 1 which shows the two parts in operative relationship. With further reference to the collar 13, it is pointed out in Figures 1 and 4 that an annular groove 16 is formed adjacent the thick end of the collar and due to the expansibility of the collar, it may be sprung to permit the disc 12 to be received in the annular groove 16. Frictional engagement between the periphery of the disc 12 and the edges of the annular groove 16 is considered sufficient to prevent rotation of the disc 12 when the shaft 8 is rotated to advance or retract the disc 12 and the collar 13, the latter being actuated by the disc 12.

In mounting the tool, the parts 5 and 13 in their relationship shown in Figure 1 are inserted in the open end of the boiler tube 2 and the shaft 8 is rotatively applied to the nut 10 and the disc 12 is advanced. The obvious result is that the collar 13 is expanded against the inner walls of the tube 2. It is apparent that any degree of rigidity may be obtained, depending upon the pressure applied in rotating the shaft 8. The tool is thus in a position to operate.

Surrounding the tubular member 4 is a cutter head 17. A series of cutters 18 are mounted in the head and held secure by set screws 19. It is important to note that the cutters are in staggered relationship in the head 17 and do not all travel in the same path. This is in order that the overall cutting surface of the several cutters will be equal or greater than the width of the weld 3 so as to insure complete removal of the superfluous metal about the tube hole.

At the opposite end of the cutter head 17 is an annular groove 20 and adjacent this groove is an annular gear ring 21 non-rotatably mounted on the head. A gear box 22 is mounted upon the tubular member 4 and held in fixed relation thereto by a set screw 23. The gear box 22 depends below the tubular member 4 to define a bearing for the cutter head advancing mechanism.

The cutter head advancing mechanism is comprised of a hollow, interiorly threaded shaft 24 having an enlargement 25 intermediate its ends. This enlargement serves to prevent other than rotative movement of the member 24, which movement is imparted by means of a handle wheel 26 on one end. An exteriorly threaded shaft 27 enters the opposite end of the member 24 and carries a fork 28. This fork lies in the annular groove 20 in one end of the cutter head 17 and previously referred to. Since the cutter head is both slidable and rotatable upon the tubular member 4, it may be advanced and retracted by manipulating the handle wheel 26 as it is being rotated.

Rotation is imparted to the cutter head 17 through an elongated gear 29 mounted on a stub shaft 30, which carries a large gear 31, disposed in the gear box 22. This large gear 31 is driven in turn by a gear 32, mounted upon a shaft 33 and which gear is also within the gear box 22. The shaft 33 extends outwardly from the gear box and to this shaft may be connected a flexible power shaft driven by some suitable source of power such as an electric motor.

Mounted at some convenient point on the gear box 22 is a gauge rod or "feeler" 34, which extends in parallel relationship with the tubular member 4. The rod 34 is normally extended by an expansible spring 35 and as the tool is mounted preparatory to operation, the position of the cutters 18 relative to the work at 3 may be determined by the extent of movement of the rod 34, which abuts the wall or tube sheet 1 during the operation of the tool.

Manifestly, the construction shown is capable of considerable modification and such modification as is considered within the scope and meaning of the appended claim is also considered within the spirit and intent of the invention.

What is claimed is:

A cutting tool including a tubular body having a tapered end arranged to be received in a confined space, an expansible collar carried by the tapered end of said body, a rotatable cutter head having an annular gear ring affixed thereto and an annular groove adjacent said gear ring, a gear housing embracing said body having an extended shaft carrying a gear capable of enmeshing said gear ring, a threaded shaft also carried by said gear housing having a yoke affixed thereto, the later reposing in the annular groove in said cutter head, means to rotate said threaded shaft to advance said cutter head in the direction of the work and means for driving the gears in said gear housing to effect rotation of said cutter head during the advancing movement thereof.

FRANK B. FOWZER.